March 17, 1970     O. K. HUDSON     3,500,688

GRAVIMETER

Filed Feb. 19, 1968     3 Sheets-Sheet 1

INVENTOR
ORLO K. HUDSON

BY

ATTORNEYS

March 17, 1970 O. K. HUDSON 3,500,688
GRAVIMETER

Filed Feb. 19, 1968 3 Sheets-Sheet 2

INVENTOR.(S)
ORLO K. HUDSON

BY

ATTORNEYS

INVENTOR.(S)
ORLO K. HUDSON

ATTORNEYS

3,500,688
GRAVIMETER
Orlo K. Hudson, Huntsville, Ala., assignor to the United
States of America as represented by the Administrator
of the National Aeronautics and Space Administration
Filed Feb. 19, 1968, Ser. No. 706,564
Int. Cl. G01v 7/00
U.S. Cl. 73—382                                                 3 Claims

ABSTRACT OF THE DISCLOSURE

A gravimeter having a vacuum chamber in which a body, having a light reflective surface, is allowed to fall. An interferometer system associated with the body including a stationary reflective surface for producing interference fringes as the body falls and a polarization rotator for balancing the amplitude of the reflected light from the body and the stationary reflective surface. A data collection system for counting with respect to time, in two adjacent time spans, the interference fringes, thereby yielding a value of acceleration of the falling body.

---

The invention described herein was made by an employee of the United States Government and may be manufactured and used by or for the Government for governmental purposes without the payment of any royalties thereon or therefor.

BACKGROUND OF THE INVENTION

Field of the invention

This invention relates generally to devices for measuring the acceleration of a moving body and more particularly to a device for the determination of the acceleration of gravity by interferometric measuring the travel of a falling body.

Description of the prior art

In the development of gravity measuring instruments, the constant trend during the past years has been to improve upon the speed of observation. Government and private agencies alike have been active in this development. Government agencies are interested in the distribution of gravity on continents and oceans as a scientific problem. Commercial enterprises utilize gravity data in search for regional and local geologic structure favorable for accumulation of natural resources.

Although several basically different methods for absolute determination of gravity have been available in the past, in practice only two of them have been or are in prospect of being used. These methods are the determination of the periods of a pendulum and the timing of a body in free fall. In both of these methods the experimentally measured variables are length and time and of these, length has been by far the more difficult to measure precisely.

For observations of gravity, pendulums have long been and are still widely used both in government and commercial work. Their accuracy has been improved upon materially by introduction of radio transmission of time signals and of the use of photo electric cells for converting light impulses of an oscillating pendulum into electrical impulses. In long practice however, it has been found impossible to determne terrestrial gravity with a smaller probable error than $\pm 10^{-6}$ times the total even with the most carefully built and elaborately calibrated multiple pendulum systems. Various causes for instability in the instrument have been suggested but have not resulted in a significant improvement. Simultaneously with the development of dynamic gravimeters such as pendulums, have been the development of instruments for measuring the acceleration of gravity by observing a body in free fall. The timing of the body in free fall could, in principle, give results that are comparable to those obtained from pendulums insofar as accuracy is concerned. Such gravimeters have in the past commonly relied upon direct photography to observe the time required for the falling body to pass certain intervals.

SUMMARY OF THE INVENTION

The present invention is directed to means for effecting extremely rapid observation of gravity or other accelerations, which have not been known heretofore, by using principles of interferometric measurement for observing a freely falling body. The instrument of present invention is in the form of a Michelson interferometer in which a first mirror is fixed and a second mirror is a freely falling body in the gravitational field. As in a conventional interferometer a beam of monochromatic and coherent light is split into two beams with the first beam directed to the stationary mirror and the second beam directed to the falling mirror. The reflected beams of light from the first and second mirrors are recombined and in accordance with the change in relative light path length traveled by the first and second beams of light interference fringes will be produced. According to the method and apparatus of the invention, the interference fringes are counted with respect to time, yielding a value of the displacement of the falling mirror as a function of time. This measurment is made in two adjacent time spans, thereby resulting in a value of acceleration of the falling mirror.

Accordingly, one object of the present invention is to provide a system for observing the effects of gravity on a falling body with a high degree of precision and accuracy.

Still another object of the invention is to provide an instrument for observing the free fall of a mass and making a record of such observation for subsequent analysis.

A still further object of the invention is to provide an apparatus that may be used in the interferometric measuring of the travel of a moving body.

BRIEF DESCRIPTION OF THE DRAWINGS

Other and further objects and advantages will be apparent to those skilled in the art from the following detailed description wherein reference is made to the accompanying drawings in which.

DESCRIPTION OF THE PREFERRED EMBODIMENT

Figure 1:
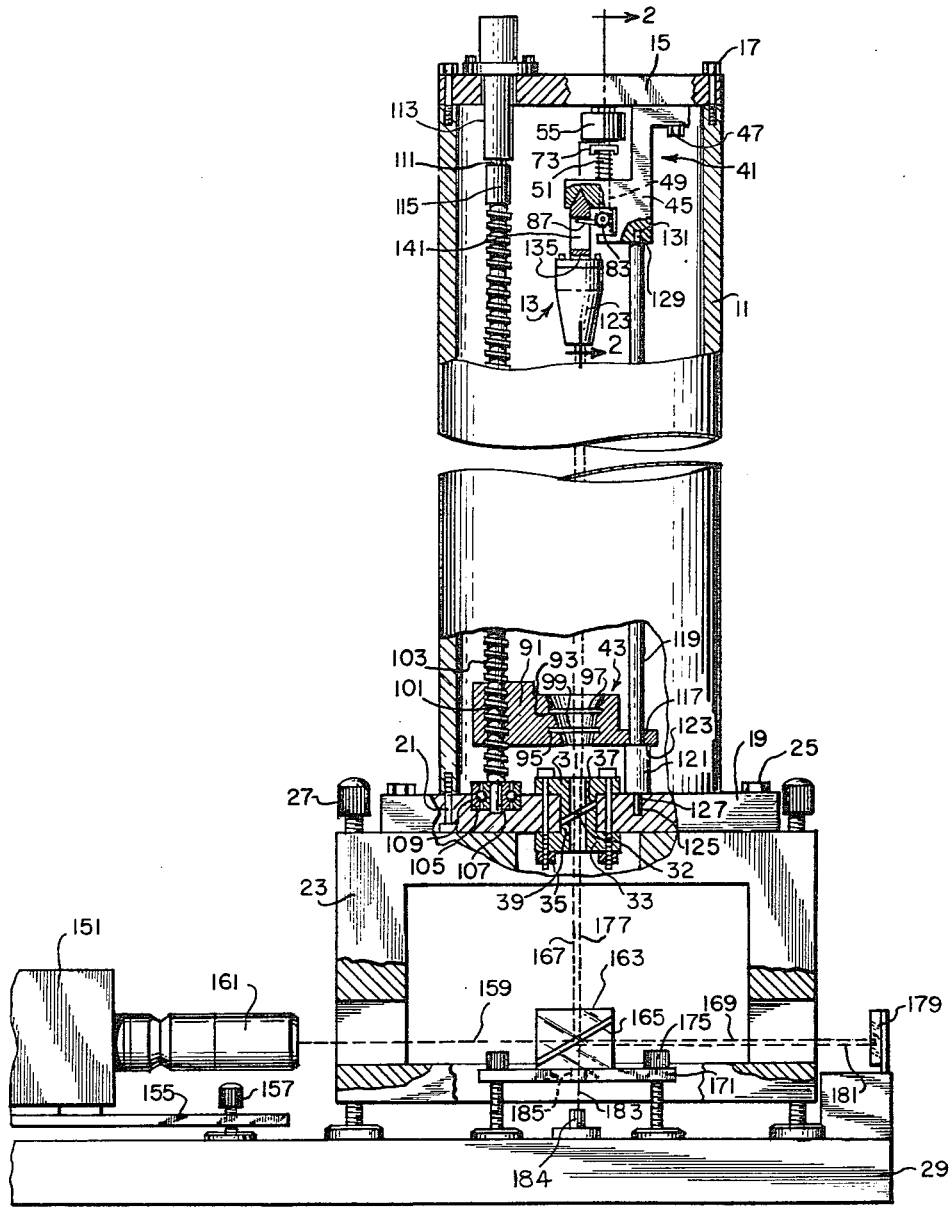
FIGURE 1 is front elevation partially broken away to condense the figure and partially in section to show details of construction of the interferometer section of the present invention.

Referring to FIGURE 1, the instrument of the present invention consists of a cylindrical housing 11 in which a body indicated at 13, whose vertical travel is measured, is allowed to fall. The upper end of the cylindrical housing 11 is closed by a wall 15, secured in place by suitable fastening devices 17 while the lower end of the cylindrical housing is closed by a wall 19 which is secured in place by suitable fastening devices 21. Wall 19 is secured to pedestal 23 by fastening devices 25 and the pedestal is supported by leveling devices 27 on table 29. To admit light into the interior of the cylindrical housing, support members 31 and 33, each having a center bore are inserted into an opening drilled in the wall 19 and are secured in place by fastening means 35. The opposite end portions of the members are machined to present surfaces 37 and 39 inclined at Brewster's angle (55°30′) with respect to the plane defined by wall 19 and a quartz window 32 is disposed between members 31 and 33 in abutting relationship with surfaces 37 and 39. Virtually all air is removed from the housing so as to eliminate any interference from the viscosity of the air traversed by the falling body.

Figure 2:
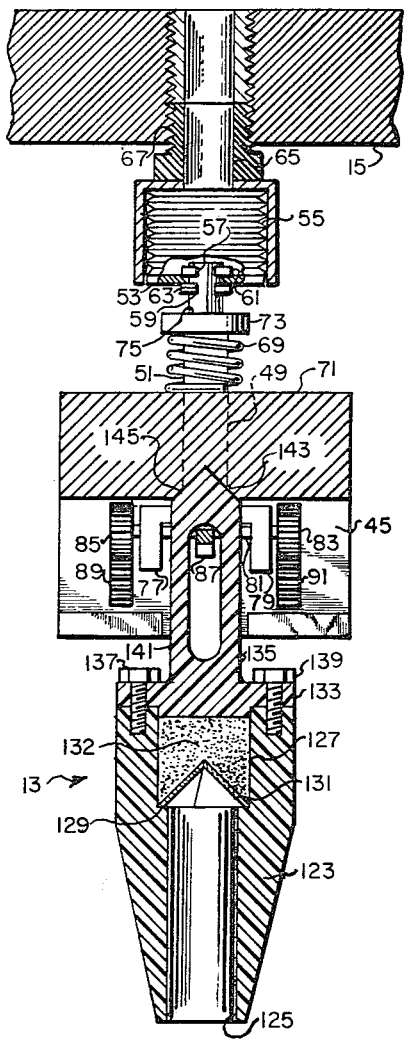
FIGURE 2 is a cross section taken along line 2—2 of FIGURE 1.

Disposed within the cylindrical housing is a release mechanism generally indicated at 41 for releasably holding the body 13 and a catcher mechanism generally indicated at 43 for catching the body on lower end of housing and returning the body to its original position. The release mechanism is preferably pneumatically operated so as to prevent electrical disturbances at the time of release of the body. As shown in FIGURES 1 and 2 the release mechanism includes a housing 45 mounted on wall 15 by bolt 47 and having a vertically positioned bore 49 for slidable receiving drive shaft 51. The upper portion of the drive shaft extends through the diaphragm 53 of a bellows 55 and is provided with annular grooves 57 and 59 in which are disposed snap rings 61 and 63 for engaging the diaphragm. The bellows 55 is provided with an externally threaded bore portion 65 for admitting air to the interior of the bellows from a conventional source of air pressure (not shown) and which is screwthreadedly mounted on a screwthreaded opening 67 drilled in the wall 15.

Arranged in embracing relationship with a portion of the drive shaft 51 is a coil spring 69, one end of which contacts with the wall 71 of housing 45 and the opposite end of which contacts with a snap ring 73 that is disposed in an annular groove 75 form in the drive shaft. The drive shaft is provided with a pair of arms 77 and 79 at its lower end. A horizontally positioned shaft 81 extends through the arms 77 and 79 for rotation with spur gears 83 and 85 affixed to the ends of the horizontal shaft and for rotation with the body support arm 87 affixed to the center of the horizontal shaft. The spur gears 83 and 85 are meshed with a pair of stationary rack gears 89 and 91 that are vertically disposed and rigidly fixed on housing 45.

As shown in FIGURES 1 and 2 the body 13 consists of a tapered cylindrical portion 123 having a center bore 125 for emitting light to the interior of the cylindrical portion. The center bore has an enlarged upper cavity 127 for presenting angular shoulder 129. A corner cube mirror 131 is disposed within the enlarged portion cavity and is supported by the angular shoulder 129. Also disposed within the enlarged cavity is packing material 132 to inhibit movement of the corner cube mirror 131. The upper end of the cavity 127 is closed by a flanged portion 133 of member 135 which is secured in place by fastening devices 137 and 139. Member 135 has machined therein a slot 141 for receiving the body support arm 87. To insure that the slot 141 is in proper position to receive the body support arm 87, member 135 is provided with a tapered upper portion 143 which mates with a camming surface 145 machined in the release mechanism housing 55. Preferably the cylindrical portion 123, member 135 and packing material 132 consists of a non-magnetic and non-electrically conductive material.

The catcher mechanism 43 consists of a cup-shaped receptacle 91 having a pair of annular grooves 93 and 95 in which are disposed a pair of O-rings 97 and 99 preferably made of an elastic material for cushioning the fall of the body. The receptacle also includes a threaded bore portion 101 which is meshed to a vertically positioned ball screw shaft 103. A ball bearing structure 105 is interposed between a reduced portion 107 of the shaft 103 and the tapped portion 109 formed in the wall 19, while the opposed end of the ball screw shaft is coupled to shaft 111 of a bidirectional motor 113 by coupling means 115. The receptacle also includes a bored portion 117 for receiving guide rod 119; the guide rod having an enlarged portion 21 presenting an angular shoulder 123 to support the receptacle in its lower position. The lower end of the guide rod has a reduced portion 125 which is mounted in a tapped opening 127 formed in the wall 19 while the upper end of the guide rod has a reduced portion 129 which is mounted in a tapped 131 opening in the release mechanism housing 41. Because of the use of the ball bearing structure 105 and of the use of the guide rod 119 to eliminate rotational movement of the receptacle, it is obvious that rotation of the motor 113 causes the receptacle 91 to move up or down the fall path of the body 13.

In the operation of the embodiment of the invention thus far described when the bellows 55 are actuated by the application of sufficient air pressure thereto, diaphragm 53 will move downwardly causing a downward movement of drive shaft 51 and horizontal shaft 81. The downward movement of the horizontal shaft causes rotation of spur gears 83 and 85 which in turn imparts rotational movement to the horizontal shaft and the body support arm 87. Preferably, sufficient air pressure is applied to the bellows so as to cause the body support arm to rotate from a substantially horizontal position to substantially a vertical position with an acceleration greater than the acceleration of gravity so as not to interfere with the release of the body 13.

The falling body 13 is caught by the cup-shaped receptacle 91 with its fall cushioned by O-rings 97 and 93. Body 13 is returned to the release mechanism 41 by energization of motor 113. This operation may be controlled manually so that when the body 13 is returned to its original position motor 113 is de-energized. It will be recognized that if the body 13 rotated during its fall, camming surface 145 mating with the tapered portion 145 of the body will cause the body to rotate back to its original position so as to be in a position to receive the body support arm 87. The air pressure applied to the bellows is now vented so as to allow the body support arm to assume its original horizontal position and engage the slotted portion 141 of the body. Motor 113 is then energized to complete the cycle by causing the receptacle to be moved to its lower position.

The light source of the invention consists of a source of monochromatic and coherent light having a wave length known to high accuracy. The light source must necessarily furnish radiation during the period of fall of the body 13 and preferably may comprise a helium neon laser 151. The laser is actuated by a conventional electronic system (not shown) and is supported on a table 155 having leveling devices 157 in contact with table 29. The output beam of light 159 of the laser is directed through a polarization rotator 161 to a beam splitter 163, having a partially silvered mirror 165 so that the beam 159 is partially reflected and partially transmitted to form beams 167 and 169.

The beam splitter 163 is supported on a stand 171 having leveling devices 175 extending through the corner portions of the stand in contact with the table 29. The beam splitter is positioned under the area defined by the quartz window 32 and the leveling devices of stand 17 and table 155 are adjusted so that the beam of light 167 is parallel to the fall path of the body 13 and to the vertical gradient of gravity. In this manner beam 167 will pass through the window 32 and the cup-shaped receptacle 91 where it will be reflected by the corner cube mirror 129 to form beam 177, which is directed back through the window to the beam splitter. A stationary mirror 179 is positioned on the side of the beam splitter 163 opposite the laser 151 to reflect the beam 169 back to the beam splitter as beam 181. The reflected beams of light 177 and 181 are recombined at the beam splitter to form beam 183 which is directed through a drilled hole 185 in stand 171. A photo detector such as a photo multiplier tube 184 is positioned beneath the area defined by hole 185 so as to receive the recombined beam 183.

It will be noted from the above that the instrument thus far described is in the form of a Michelson interferometer in which one mirror is fixed and a second mirror is a freely falling body in the gravitational field $g$. Letting X represent the distance fallen along the gravitational field vector by the falling mirror then at the photodetector, interference fringes are observed in this configuration when a difference of one-half wavelength exists between the light path of beams 169 and 181 and the light path of beams 167 and 177, or $$2x = o, \lambda, 2\lambda, 3\lambda \ldots N\lambda$$

wherein $\lambda$ is the wave length of the light source.

The number of fringes N observed in a distance X is:

$$2x = N\lambda$$

or $$N = \frac{2x}{\lambda}$$

Differentiating this expression twice with respect to time to obtain a relation for gravity $g$:

$$-g = \ddot{x} = \frac{\lambda}{2}\ddot{N}$$

Subject to the initial condition:

$$N = o, \quad \dot{N} = \dot{N}_o$$

at $t = 0$ and integrating this expression one finds:

$$N = \frac{-g \cos \theta}{\lambda} t^2 + \dot{N}_o t \qquad (1)$$

Wherein $\theta$ is the angle between the beam of light 167 and the fall path of the falling mirror. As previously indicated in preferred embodiment of the invention of light 167 is directed parallel to the fall path of body 13 by adjustment of leveling devices 175 and 157 so that $\theta$ is substantially zero degrees. Equation 1 may therefore be reduced to:

$$N = \frac{-g}{\lambda} t^2 + \dot{N}_o t \qquad (2)$$

If time is determined by counting the number of oscillations of a standard oscillator of frequency $f$ (hereinafter referred to as the clock) then:

$$n = \int_0^t f \, dt \qquad (3)$$

or $$t = \frac{n}{f}$$

Wherein $n$ is the clock pulse number.

Substituting the expression for $t$ of Equation 3 into Equation 2:

$$N = -\frac{g}{f^2 \lambda} n^2 + \frac{\dot{N}_o}{f} n \qquad (4)$$

In the preferred embodiment of the present invention it is contemplated to allow the body to fall a short distance to allow the body and photo multiplier tube to stabilize. In Equation 4, the unknowns to be experimentally computed from observing the body fall in the gravitational field vector are $g$ and $\dot{N}$ since the body will have an initial velocity when the measurement starts. To compute $g$ two equations are therefore required to permit a simultaneous solution of Equation 4 thereby necessitating that two measurements be made for each experiment. Designating these measurements as A and B and eliminating $\dot{N}$ in Equation 4 the following expression for gravity $g$ is obtained:

$$g = (f^2 \lambda) \frac{N_A n_B - N_B n_A}{n_A n_B (n_A + n_B)} \qquad (5)$$

Figure 3:
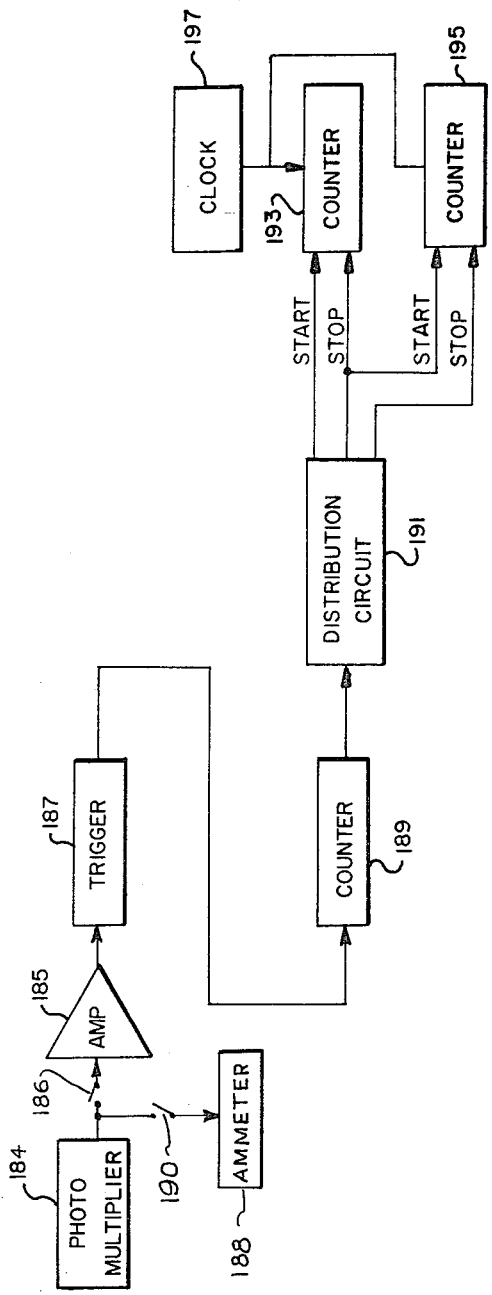
FIGURE 3 is an electrical block diagram of the data collection section of the present invention.

To experimentally collect the data required for the solution of Equation 4 and to insure maximum effectiveness of the interference phenomenon in the recombined beam 183, a data collection system, shown in block diagram form in FIGURE 3 is provided. The output of the photo multiplier tube 184 is coupled to an amplifier 185 by switch 186 and to an ammeter 188 by switch 190. The output of the amplifier is applied to a trigger circuit 187 which produces an output pulse for each interference fringe detected by the photo multiplier tube and has its output coupled to preset counter 189. The preset counter functions to count the output pulses of the trigger circuit and to produce an output pulse after a predetermined number of pulses have occurred. The output of the preset counter 189 is fed to a distribution circuit 191, which may be of the form of a three position stepping switch for applying the first output pulse of the preset counter to the start input of counter 193, the second output pulse of preset counter to the stop input of counter 193 and to the start input of counter 195, and the third output pulse of preset counter to the stop input of counter 195. A clock source 197 is provided having its output connected to the input of counter 193 and to the input of counter 195.

In actual practice, due to complications of polarization effects occurring in the beam splitter 163, inequalities in amplitudes of the two beams reflected from mirrors 173 and 131 can occur, which limits the effectiveness of the interference phenomenon in recombined beam 183. It has been discovered however, that with proper rotation of the polarization rotator 161 (FIGURE 1) the amplitudes of the reflected beams 177 and 181 can be adjusted so as to balance the radiation received by the photo multiplier tube 184 and obtain maximum effectiveness of the interference phenomenon. This operation may be accomplished by applying the output of the photo multiplier 184 to the ammeter 188 by closing switch 190 and opening switch 186. To equalize the amplitudes of the reflected beams 177 and 181 first one and then the other reflected beam is physically blocked from impinging on the photo multiplier 184 and the amplitude of the output current of the photo multiplier is read on the ammeter 188. The polarization rotator is adjusted and the cycle is repeated until the amplitude of the output current of the photo mutiplier 184 under each condition is equal.

With the amplitudes of the reflected beams 181 and 177 equalized, switch 90 is opened and switch 86 is closed and the body 13 is allowed to fall in the manner previously described. As the body falls through the cylindrical housing 11 interference fringes will be produced in the recombined beam 183, which are sensed by the photo multiplier 184 and converted into electrical pulses by trigger circuit 187. After each series of a preset number of pulses, preset counter 189 will produce an output pulse. The distribution circuit 191 applies the first output pulse to the start input of counter 193, the second output pulse to the stop input of counter 193 and to the start input of counter 195 and the third output pulse to the stop input of counter 195.

It will thus be seen that counters 193 and 195, having their respective inputs coupled to the output of clock source 197, record the time, in the form of clock pulses, for the body 13 to fall through two consecutive distances determined by the number of interference fringes counted by the preset counter 189. In the aforedescribed embodiment these distances will be equal since the preset counter produces an output pulse after each series of an equal number of interference fringes. It is also seen that the timing of the fall of the body is delayed until the first output pulse of the preset counter 189 occurs so that the body and the photo multiplier may stabilize.

Although certain specific illustrative details have been described, it is to be apprehended that these details are presented merely to assist in the construction of a suitable form of apparatus and in no way constitute the invention per se. The invention must therefore be deemed to include equivalent electrical circuits and mechanical structures within the scope of the appended claims.

What is claimed is:
1. In an instrument for use in measuring gravity:
    a vertically positioned container capable of holding a vacuum;
    a body adapted for free fall within said container, said body composed of a non-magnetic and non-electrically conductive material;
    pneumatically operated means adjacent to one end of said container for releasably holding said body in a position for said body to fall wthin said container when released;
    a light source producing a beam of monochromatic and coherent light;
    interferometer means associated with said body for producing interference fringes in response to movement of said body comprising a light dividing element disposed in the path of said beam for dividing said light beam into first and second light beams, a first reflecting element, means disposing said first reflecting element in coactive relation with said light dividing element to reflect said first beam back to said light dividing element so as to establish as the standard light path for said interferometer the length of the light path from said light dividing element to said light reflecting element and back to said light dividing element, a second reflecting element disposed on said body for reflecting said second light beam back to said light dividing element for recombination with said first light beam to produce thereat measurable interference fringe patterns;
    a circuit means including a photomultiplier responsive to said interference fringes for converting said interference fringes into electrical pulses;
    a first preset counter circuit responsive to said electrical pulses for producing an output pulse each time that a predetermined member of said electrical pulses have occurred; and
    means responsive to said first counter circuit for measuring the time between first and second output pulses and second and third output pulses.

2. The arrangement as claimed in claim 1 including means connected to the light dividing element for aligning said second beam parallel to the fall path of said body.

3. The arrangement as defined in claim 1 including means for equalizing the intensity of the return beams from said first and second reflecting means, said equalizing means comprising a polarization rotator between the light source and interferometer.

References Cited

UNITED STATES PATENTS

| 3,266,289 | 8/1969 | Stamy | 73—12 |
| 3,429,184 | 2/1969 | Russell | 73—382 |

FOREIGN PATENTS

| 1,085,350 | 7/1960 | Germany. |

OTHER REFERENCES

Faller, Precision measurement of the Acceleration of Gravity in Science, Oct. 6, 1967, vol. 158 No. 3797, pp. 64–66.

JAMES J. GILL, Primary Examiner

H. GOLDSTEIN, Assistant Examiner

U.S. Cl. X.R.

356—106